US006991743B2

(12) United States Patent
Poole et al.

(10) Patent No.: US 6,991,743 B2
(45) Date of Patent: Jan. 31, 2006

(54) REFRIGERANT FOR CENTRIFUGAL COMPRESSORS

(75) Inventors: John Edward Poole, Cheshire (GB); Richard Powell, Cheshire (GB); James Victor Thomas, Nova Scotia (CA)

(73) Assignee: RPL Holdings Limited, (GB)

( * ) Notice: Subject to any disclaimer, the term of this patent is extended or adjusted under 35 U.S.C. 154(b) by 132 days.

(21) Appl. No.: 10/393,203

(22) Filed: Mar. 18, 2003

(65) Prior Publication Data

US 2004/0026655 A1 Feb. 12, 2004

(30) Foreign Application Priority Data

Mar. 19, 2002 (GB) .................................... 0206413

(51) Int. Cl.
*C09K 5/04* (2006.01)
(52) U.S. Cl. ....................................................... 252/67
(58) Field of Classification Search ................. 252/67, 252/68
See application file for complete search history.

(56) References Cited

U.S. PATENT DOCUMENTS

| | | |
|---|---|---|
| 4,138,855 A | 2/1979 | Jahan et al. |
| 4,198,313 A | 4/1980 | Bargigia et al. |
| 4,272,960 A | 6/1981 | Wahl, III |
| 4,482,465 A | 11/1984 | Gray |
| 4,810,403 A | 3/1989 | Bivens et al. |
| 4,941,986 A | 7/1990 | Jolly |
| 4,944,890 A | 7/1990 | Deeb et al. |
| 5,026,497 A | 6/1991 | Merchant |
| 5,080,823 A | 1/1992 | Arnaud et al. |
| 5,108,637 A | 4/1992 | Pearson |
| 5,182,040 A | 1/1993 | Bartlett et al. |
| 5,304,320 A | 4/1994 | Barthelemy et al. |
| 5,360,566 A | 11/1994 | Stevenson |
| 5,370,812 A | 12/1994 | Brown |
| 5,417,871 A | 5/1995 | Minor et al. |
| 5,425,890 A | 6/1995 | Yudin et al. |
| 5,458,798 A | 10/1995 | Lunger et al. |
| 5,622,644 A | 4/1997 | Stevenson et al. |
| 5,624,596 A | 4/1997 | Lunger et al. |
| 5,626,790 A | 5/1997 | Minor |
| 5,672,293 A | 9/1997 | Minor et al. |
| 5,766,511 A | 6/1998 | Musso et al. |
| 5,785,883 A | 7/1998 | Minor et al. |
| 5,848,532 A | 12/1998 | Gamble et al. |
| 5,924,847 A | 7/1999 | Scaringe et al. |
| 5,954,995 A | 9/1999 | Goble |
| 6,106,740 A | 8/2000 | Powell et al. |
| 6,117,356 A | 9/2000 | Powell et al. |
| 6,176,102 B1 | 1/2001 | Novak et al. |
| 6,248,255 B1 | 6/2001 | Pearson |
| 6,695,973 B1 * | 2/2004 | Musso et al. .................. 252/67 |

FOREIGN PATENT DOCUMENTS

| | | |
|---|---|---|
| DE | 41 16 274 C2 | 11/1992 |
| EP | 0 430 169 A1 | 6/1991 |
| EP | 0 430 169 B1 | 6/1991 |
| EP | 0 509 673 A1 | 10/1992 |
| EP | 0 539 952 A1 | 5/1993 |
| EP | 557533 A1 * | 9/1993 |
| EP | 0 608 164 A1 | 7/1994 |
| EP | 0 659 862 A1 | 6/1995 |
| EP | 0 659 862 B1 | 6/1995 |
| EP | 0 565 265 B1 | 10/1995 |
| EP | 0 720 639 B1 | 7/1996 |
| JP | 06220430 A2 | 8/1994 |
| JP | 07173462 A2 | 7/1995 |
| JP | 08143696 A2 | 6/1996 |
| JP | 08170074 A2 | 7/1996 |
| JP | 09208940 A2 | 8/1997 |
| JP | 04018484 A2 | 1/1999 |
| JP | 11-181414 | 7/1999 |
| WO | WO 92/11339 | 7/1992 |
| WO | WO 92/16597 | 10/1992 |
| WO | WO 94/00529 * | 1/1994 |
| WO | WO 94/26835 | 11/1994 |
| WO | WO 95/08602 | 3/1995 |
| WO | WO 96/03473 A1 | 2/1996 |
| WO | WO 97/15637 | 5/1997 |
| WO | WO 98/08912 | 5/1998 |

* cited by examiner

*Primary Examiner*—John R. Hardee
(74) *Attorney, Agent, or Firm*—Beyer Weaver & Thomas LLP

(57) ABSTRACT

A refrigerant comprising:
  a hydrofluorocarbon component comprising a mixture of: R134a, R227ea and optionally R125,
  and not more than 6.5% of a hydrocarbon component;
  wherein the amount of R227ea and R125 if present, is at least 35% of the hydrofluorocarbon component.

20 Claims, No Drawings

REFRIGERANT FOR CENTRIFUGAL COMPRESSORS

This invention relates to a refrigerant for centrifugal compressors and positive displacement, particularly but not exclusively to a refrigerant to replace R12, dichlorodifluoroethane in centrifugal or reciprocating compressor systems which use mineral oil as a lubricant. The refrigerant also finds applications in new equipment lubricated with polyol ethers.

In a typical flooded evaporator the tubes carrying the water or brine to be cooled are nested closely together, concentrating a large heat exchange area within a small volume. The result is very rapid boiling. Since the tubes are surrounded by a turbulent mixture of vapour and liquid, this would be expected to generate an aerosol of droplets containing oil dissolved in refrigerant in the vapour leaving the volume around the heat exchanger tubes. This vapour is wet and should be de-superheated before entering the compressor suction. This is achieved by having an extra heat exchanger area for this purpose within the shell of the flooded evaporator or in a separate vessel. The aerosol droplets will be heated by this heat exchange area and excess refrigerant will flash off leaving a solution of residual refrigerant on oil. In some designs a small quantity of the refrigerant mixture is bled through a tube from the pool in the evaporator and fed into an oil recovery unit where the refrigerant is flashed off as vapour leaving oil that is returned to the compressor bearings.

According to the present invention a refrigerant for a centrifugal compressor comprises:
  a hydrofluorocarbon component comprising a mixture of:
    R134a, R227ea and optionally R125,
  and not more than 6.5% of a hydrocarbon component;
  wherein the amount of R227ea and R125 if present, is at least 35% of the hydroflourocarbon component.

Percentages and other amounts referred to in this specification are by weight unless indicated otherwise. Percentages or other proportions are selected to total 100%.

Hydrocarbon is preferably selected from: butane, isobutane (2-methyl propane), propane, cyclopentane, isopentane (2-methyl butane), neopentane (2,2-dimethyl propane) and pentane. Preferred hydrocarbons are butane, isobutane and propane. Mixtures of hydrocarbons may be employed. The most preferred hydrocarbon is butane.

Use of the three components n-butane HFC-227ea and HFC-134a as an R12 replacement in centrifugal compressors affords the following important advantages.

HFC-227ea is a good fire suppressant. The quantity of the flammable component can therefore be maximised while still retaining non-flammability in the blend.

HFC-227ea has a molecular weight substantially higher than that of CFC-12. HFC-227ea can be mixed with components that have lower molecular weights than CFC-12, but contribute other advantages, to produce a blend with a molecular weight similar to that of CFC-12.

Butane promotes the solubility of mineral oil in the blend. Blends containing HFC-227ea and a hydrocarbon, preferably n-butane provides the surprising advantage of emulsifying the lubricating oil in the blend. The emulsion is effective in ensuring oil return to the compressor and/or reservoir. Either of these components alone does not exhibit this effect.

HFC-134a helps improve energy efficiency.

HFC-227ea and butane form azeotropic and near-azeotropic compositions so that the risk of fractionation into flammable mixtures is minimised.

The boiling points of HFC-134a and HFC-227ea differ by only ~6° C. so the two fluids form near-azeotropic mixtures. This minimises fractionation of the lower MW 134a from the higher MW heavier 227ea preventing the formation of vapour fractions having significantly lower molecular weights than that of the formulated blend.

The amount of R134a in a composition in accordance with this invention is preferably 30–70%, more preferably 40–70%, most preferably 45–65%.

The amount of R227ea in a composition in accordance with this invention is preferably 30–65%, more preferably 30–55%, most preferably 30–50%.

The amount of hydrocarbon in a composition in accordance with this invention is preferably from a trace to 10%, more preferably 0.5–6%, most preferably 2–5%.

The amount of R125 in a composition in accordance with this invention is preferably a trace to 10%, more preferably 6% most preferably 4%.

The total amount of R125 and R227ea is preferably at least 40%, more preferably at least 45% of the hydrofluorocarbon component.

The speed of sound through the vapour of a composition in accordance with this invention, is preferably equal to or less than 138 m/s 25° C. and preferably equal to or less than 136 m/s but greater than 125 m/s.

An acceptable replacement refrigerant may have a maximum pressure not greater than 2 bar greater than that of R12 at 45° C., preferably not greater than 1.5 bar, most preferably not greater than 1 bar than the pressure of R12 at this temperature.

In preferred compositions of this invention the mean molecular weight is at least 118, preferably not less than 121.

Although flammable compositions can be used where appropriate precautions can be taken, for example on chemical plants, preferred compositions are non-flammable.

A preferred embodiment of this invention comprises:
  R134a 40–55%
  R227ea 30–55%
  R125 3–7%
  butane 2–5%

A particularly preferred embodiment comprises:
  R134a 45–55%
  R227ea 35–70%
  R125 4%
  butane 3%

The invention is further described by means of example, but not in any limitative sense.

EXAMPLES

Cycle Conditions

The performances of R134a/227ea/isobutane and R134a/227ea/125/isobutane compositions were evaluated using standard refrigeration cycle analysis techniques provided by the NIST 'CYCLE D' program in order to assess their suitability as retrofit replacements for R12 in centrifugal compressor systems. The operating conditions, used for the analyses were chosen as being typical of those conditions that are found such systems. Comparative data was generated for R12 under the same conditions

| COOLING DUTY DELIVERED EVAPORATOR | 1 MW |
|---|---|
| Fluid evaporation temperature | 0° C. |
| Superheating | 5.0° C. |
| Suction line pressure drop (in saturated temperature) | 1.5° C. |
| CONDENSER | |
| Fluid condensing temperature | 45.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Electric motor efficiency | 0.85 |
| Compressor isentropic efficiency | 0.7 |
| Compressor volumetric efficiency | 1.00 |
| PARASITIC POWER | |
| Indoor pumps and fans | 30 kW |
| Outdoor pumps and fans | 40 kW |
| Controls | 1 kW |

The cycle results for various blends are shown in Table 1. Examples 1 to 4 do not contain R125. Examples 5 to 11 include 125 to boost capacity. Table 2 gives the cycle results for blends containing butane.

TABLE 1

| Example No | 1 | 2 | 3 | 4 | 5 | 6 | 7 | 8 | 9 | 10 | 11 | 12 | R-12 |
|---|---|---|---|---|---|---|---|---|---|---|---|---|---|
| Weight % 134a | 30 | 40 | 45 | 50 | 30 | 35 | 40 | 42 | 45 | 50 | 51 | 65 | |
| Weight % 227ea | 60 | 55 | 50 | 45 | 55 | 55 | 50 | 48 | 45 | 42 | 42 | 30 | |
| Weight % 600a | 10 | 5 | 5 | 5 | 10 | 5 | 5 | 5 | 5 | 3 | 03 | 5 | |
| Weight % 125 | | | | | 5 | 5 | 5 | 5 | 5 | 5 | 4 | | |
| Mol. Weight | 122 | 125 | 122 | 119 | 120 | 126 | 123 | 122 | 120 | 120 | 120 | 111 | 121 |
| Speed of sound (m/s 25° C. dew point) | 129.0 | 127.5 | 129.1 | 130.7 | 129.7 | 126.6 | 128.2 | 128.8 | 129.8 | 129.8 | 130.0 | 135.6 | 135.3 |
| Discharge pressure (bar) | 10.84 | 11.22 | 11.42 | 11.59 | 11.40 | 11.59 | 11.79 | 11.86 | 11.96 | 12.03 | 11.95 | 12.00 | 11.21 |
| Pressure ratio | 4.22 | 4.26 | 4.25 | 4.24 | 4.20 | 4.25 | 4.24 | 4.24 | 4.23 | 4.26 | 4.26 | 4.23 | 3.82 |
| Discharge temperature (° C.) | 74.4 | 76.2 | 77.3 | 78.5 | 75.2 | 75.9 | 77.0 | 77.5 | 78.1 | 79.2 | 79.3 | 81.9 | 96.7 |
| COP (system) | 2.12 | 2.12 | 2.12 | 2.12 | 2.12 | 2.11 | 2.11 | 2.11 | 2.11 | 2.12 | 2.12 | 2.12 | 2.16 |
| Capacity (MW/m$^3$) | 164.9 | 170.5 | 173.9 | 177.1 | 173.2 | 175.2 | 178.7 | 180.0 | 181.9 | 183.3 | 182.2 | 184.9 | 186.4 |

TABLE 2

| Example No. | 13 | 14 | 15 | 16 |
|---|---|---|---|---|
| Weight % 134a | 50 | 51 | 50 | 42 |
| Weight % 227ea | 42 | 42 | 41 | 46 |
| Weight % 600 (butane) | 3 | 3 | 3 | 5 |
| Weight % 125 | 5 | 4 | 6 | 7 |
| Mol. Weight | 120 | 120 | 120 | 121 |
| Speed of sound (m/s 25° C. dew point) | 130.4 | 130.6 | 130.6 | 130.3 |
| Discharge pressure (bar) | 11.63 | 11.56 | 11.74 | 11.43 |
| Pressure ratio | 4.29 | 4.30 | 4.29 | 4.29 |
| Discharge temperature (° C.) | 79.5 | 79.5 | 79.6 | 78.3 |
| COP (system) | 2.13 | 2.13 | 2.12 | 2.13 |
| Capacity (MW/m$^3$) | 178.0 | 176.9 | 179.5 | 174.7 |

Example 17

To ensure That oil can return from the flood evaporators, typically found in systems consisting centrifugal compressors, it is required that the mineral oil be miscible with, or dispersible, with the HFC refrigerant blends under the conditions found in such evaporators. As a comparison 1.0 g of Mobile Arctic 155 refrigeration lubricating oil was weighed into a 125 glass formulation vessel capable of withstanding the pressure of the HFC blends being tested as R12 replacements. The vessel was evacuated and 100 g of composition containing 93% R134a, 5% R125 and 2% pentane (by weight) was introduced by liquid transfer. The vessel was shaken vigorously by hand for ~30 s. The oil rapidly separated forming an upper layer and leaving a clear, lower refrigerant layer. No emulsion was formed.

Example 18

0.9 g of Mobile Arctic 155 lubricating oil was weighed into 125 ml glass formulation vessel capable of withstanding the pressure of the HFC blends being tested as R12 replacements. The vessel was evacuated and a composition 51% 134a, 42% 227ea, 5% 125 and 3% n-butane,(by weight) was introduced by liquid transfer. The vessel was shaken vigorously by hand for ~30 s. A white emulsion was formed with a small quantity of the oil floating on the surface. The emulsion did not visibly separate after standing for 30 m. On cooling in an ice/water bath the "milkiness" of the emulsion increased but again no other visible separation was noted. On warming the mixture to room temperature the milkiness was reduced, but after further 30 minutes produced no further change was noted.

The COPs of the blends used in the examples are not more than 2% lower than that of R12. This demonstrates that energy efficiencies of the formulations exemplified are acceptable. The discharge temperatures of all blends are below those of R12. i.e. there is no risk of overheating the compressor.

All blends have capacities greater than 85% and are therefore acceptable as replacements for R12. All blends except Blend 1 have capacities greater than 90% of that of R12 and are therefore preferred. Blends 4, 6, 7, 8, 9, 10, 11, 12, 13, 14, and 15 have capacities greater than 95% of R12 so are especially preferred.

The discharge pressures of all the blends do not exceed that of R12 by more than 1 bar so all are acceptable.

The speed of sound in all the blends is less than or similar to that of R12 that makes them suited to centrifugal compressors than R12.

R227ea promotes the dispersibility of mineral in the HFC blend and thus assists oil return.

What is claimed is:

1. A refrigerant comprising
   a hydrofluorocarbon component comprising a mixture of R134a, R227ea and R125,
   and from a trace up to 6.5% butane;
   wherein the amount of R227ea is 30–65% of the hydrofluorocarbon component and the total combined amount of R227ea and R125, is at least 35% of the hydrofluorocarbon component.

2. A refrigerant as claimed in claim 1, wherein the amount of R134a is 30–70%.

3. A refrigerant as claimed in claim 2, wherein the amount of R134a is 40–70%.

4. A refrigerant as claimed in claim 3, wherein the amount of R134a is 45–65%.

5. A refrigerant as claimed in claim 1, wherein the amount of R227ea is 30–55%.

6. A refrigerant as claimed in claim 5, wherein the amount of R227ea is 30–50%.

7. A refrigerant as claimed in claim 1, wherein the amount of butane is 0.05–6%.

8. A refrigerant as claimed in claim 7, wherein the amount of butane is 2–5%.

9. A refrigerant as claimed in claim 1, wherein the amount of R125 is from a trace to 10%.

10. A refrigerant as claimed in claim 9, wherein the amount of R125 is 2–8%.

11. A refrigerant as claimed in claim 10, wherein the amount of R125 is 3–6%.

12. A refrigerant as claimed in claim 1, wherein the total combined amount of R125 and R227ea is at least 40% of the hydrofluourocarbon component.

13. A refrigerant as claimed in claim 12, wherein the total combined amount of R125 and R227ea is at least 45% of the hydrofluourocarbon component.

14. A refrigerant composition as claimed in claim 1, wherein the speed of sound through the vapour of the refrigerant is equal to or less than 138 m/s at 25° C.

15. A refrigerant as claimed in claim 14, wherein the speed of sound is between 136 and 125 m/s at 25° C.

16. A refrigerant as claimed in claim 1 having a maximum pressure not greater than 2 bar greater than that of R12 at 45° C.

17. A refrigerant as claimed in claim 16, wherein the maximum pressure is 1.5 bar greater than that of R12 at 45° C.

18. A refrigerant as claimed in claim 17, wherein the maximum pressure is not greater than 1 bar than the pressure of R12 at 45° C.

19. A refrigerant as claimed in claim 1, having a mean molecular weight of at least 118.

20. A refrigerant as claimed in claim 19, wherein the mean molecular weight is not less than 121.

* * * * *